(12) United States Patent
Eshelman

(10) Patent No.: US 7,902,458 B2
(45) Date of Patent: Mar. 8, 2011

(54) ELECTRICAL OUTLET COVER PLATE

(75) Inventor: Brandon Eshelman, Salt Lake City, UT (US)

(73) Assignee: 360 Electrical, LLC, Salt Lake City, UT (US)

( * ) Notice: Subject to any disclaimer, the term of this patent is extended or adjusted under 35 U.S.C. 154(b) by 0 days.

(21) Appl. No.: 12/141,807

(22) Filed: Jun. 18, 2008

(65) Prior Publication Data

US 2009/0314509 A1 Dec. 24, 2009

(51) Int. Cl.
*H02G 3/14* (2006.01)
(52) U.S. Cl. ............... 174/66; 174/67; 220/241; 220/242; D13/177
(58) Field of Classification Search .......... 174/66, 174/67, 135, 53, 58; 220/241, 242, 3.8, 3.2, 220/3.3; D8/353; D13/177, 156; 439/535, 439/536
See application file for complete search history.

(56) References Cited

U.S. PATENT DOCUMENTS

| | | | |
|---|---|---|---|
| 2,740,873 A | 4/1956 | Cronk | |
| 4,500,746 A | 2/1985 | Meehan | |
| 5,073,681 A * | 12/1991 | Hubben et al. | 174/66 |
| 5,180,886 A | 1/1993 | Dierenbach et al. | |
| 5,477,010 A | 12/1995 | Buckshaw et al. | |
| 5,723,817 A | 3/1998 | Arenas et al. | |
| 5,998,735 A * | 12/1999 | Patterson, Jr. | 174/67 |
| 6,278,062 B1 * | 8/2001 | Sowdon | 174/66 |
| 6,364,673 B1 * | 4/2002 | Lee | 174/67 |
| 6,609,927 B2 | 8/2003 | Kidman | |
| 7,071,414 B2 | 7/2006 | Kim | |
| 7,119,278 B1 | 10/2006 | Shotey et al. | |
| 7,122,740 B2 | 10/2006 | Xu et al. | |
| 7,183,487 B1 * | 2/2007 | O'Young et al. | 174/66 |
| 7,541,541 B1 * | 6/2009 | Baldwin et al. | 174/67 |
| 2006/0110948 A1 | 5/2006 | Gerard | |

* cited by examiner

*Primary Examiner* — Angel R Estrada
(74) *Attorney, Agent, or Firm* — Denko Coburn & Lauff LLP

(57) ABSTRACT

The present disclosure describes a plate assembly for an electrical outlet. In some embodiments, the plate assembly includes a strapping plate that is attachable to the electrical outlet, and a cover plate sub-assembly that is selectively attachable to the strapping plate. In some embodiments, the cover plate sub-assembly includes a body portion that lies in a first plane, and a first retention member that is fixed to the body portion, and that lies in a second plane parallel to the first plane. The first retention member selectively engages the strapping plate to releasably secure the cover plate sub-assembly thereto. Embodiments of an electrical outlet assembly that implement the plate assembly are also described.

20 Claims, 6 Drawing Sheets

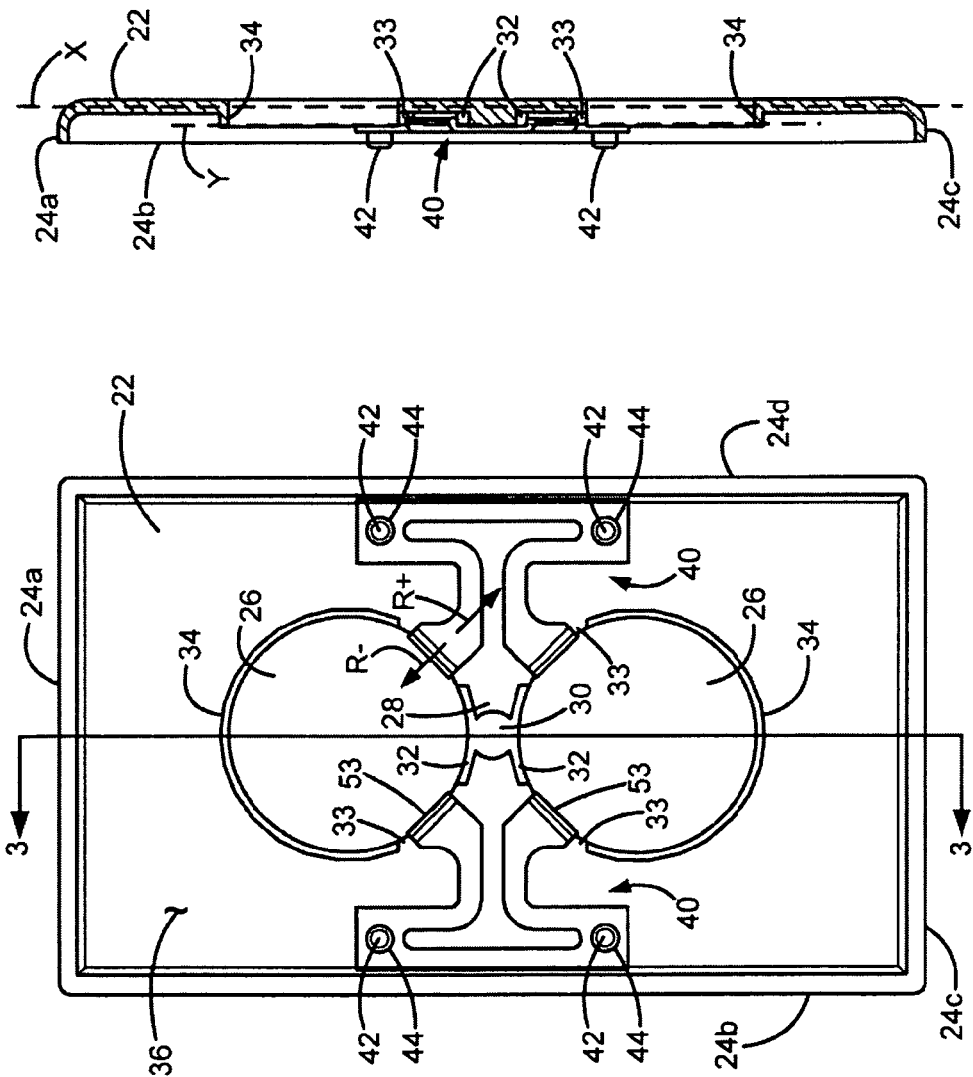

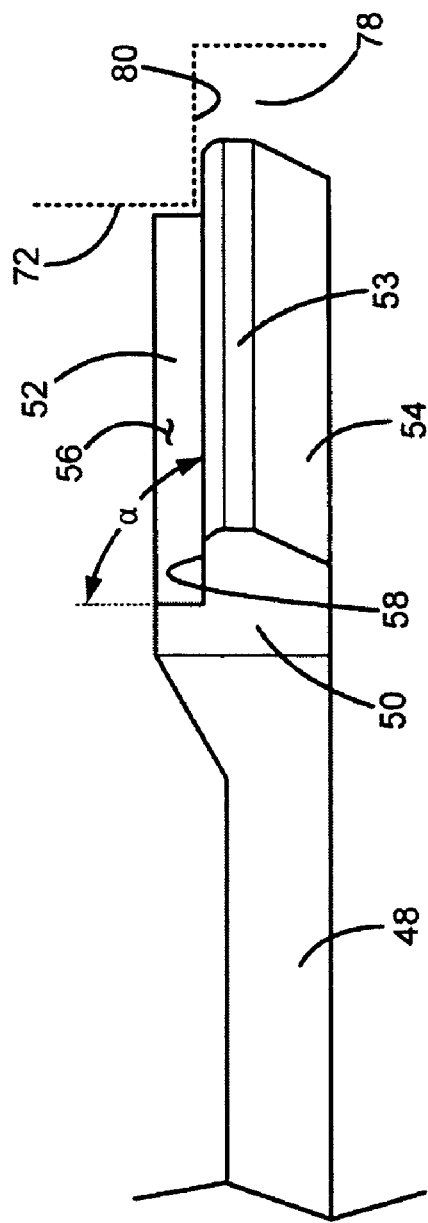
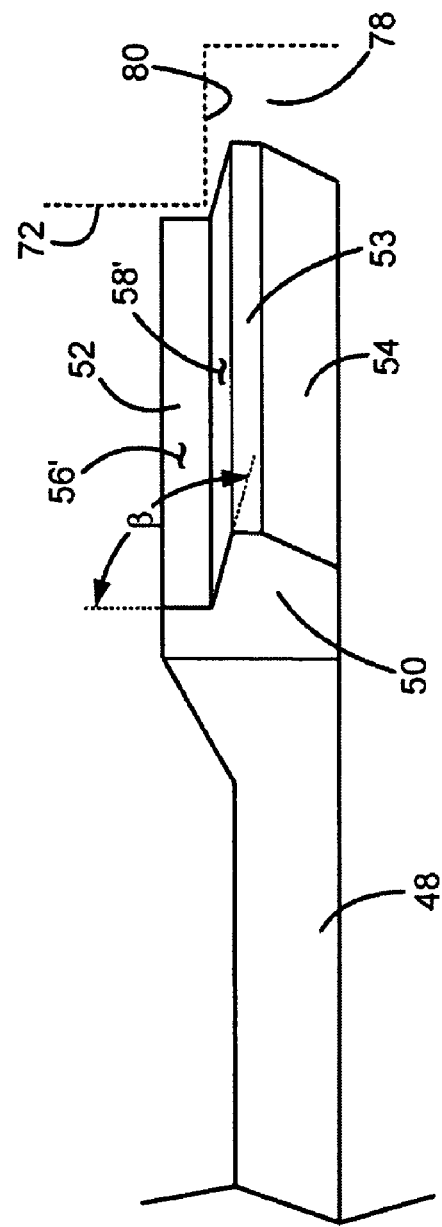

ELECTRICAL OUTLET COVER PLATE

TECHNICAL FIELD

This disclosure relates to electrical outlets, and more particularly to a cover plate for an electrical outlet.

BACKGROUND

As the number of electrical appliances in the average household grows, the need for convenient access to numerous electrical outlets also grows. Electrical outlet assemblies are, of course, well known in the art and typically comprise a cover plate, and an electrical outlet having multiple female sockets, or electrical receptacles.

In general, an electrical outlet assembly is assembled into an electrical box that is mounted within a wall. Electrical leads that run into the electrical box are connected to the electrical outlet, and the electrical outlet assembly is secured to the electrical box. The electrical outlet assembly can be secured by various fastening mechanisms including, but not limited to, screws. The cover plate of the electrical outlet assembly serves a number of functions including, but not limited to, aesthetics and safety. For example, the cover plate covers the electrical leads and components of the electrical outlet to inhibit unintentional contact. The cover plate can be shaped or can include a design to be aesthetically pleasing and to conform with a design theme of a room or environment in which the electrical outlet is located.

Traditionally, cover plates are secured using fastening mechanisms including, but not limited to, screws. Manual installation of screws or other fasteners is often time consuming. In some circumstances, an installer is required to hold several other components while mounting and securing the cover plate. Maintaining the components in proper alignment can be difficult, can require skill, and increases the complexity of the electrical outlet installation process. By obviating the need for securing the cover plate using fastening mechanisms such as screws, the installation process can be simplified, can require less skill, and can be shortened.

SUMMARY

Embodiments of the present disclosure provide a plate assembly that includes a strapping plate that is attachable to the electrical outlet, and a cover plate sub-assembly that is selectively attachable to the strapping plate. In some embodiments, the cover plate sub-assembly includes a body portion that lies in a first plane, and a first retention member that is fixed to the body portion, and that lies in a second plane parallel to the first plane. The first retention member selectively engages the strapping plate to releasably secure the cover plate sub-assembly thereto.

Other embodiments of the present disclosure provide an electrical outlet assembly that includes an electrical outlet having at least one electrical receptacle, and a plate assembly that is attached to the electrical outlet. In some embodiments, the plate assembly includes a strapping plate that is attachable to the electrical outlet, and a cover plate sub-assembly that is selectively attachable to the strapping plate. In some embodiments, the cover plate sub-assembly includes a body portion that lies in a first plane, and a first retention member that is fixed to the body portion, and that lies in a second plane parallel to the first plane. The first retention member selectively engages the strapping plate to releasably secure the cover plate sub-assembly thereto.

In still other embodiments, the present disclosure provides a plate assembly for an electrical outlet, the plate assembly including a strapping plate that is attachable to the electrical outlet, and that includes a recess defined therein, and a cover plate sub-assembly that is selectively attachable to the strapping plate. In some embodiments, the cover plate sub-assembly includes a body portion that lies in a first plane, and that has an opening therethrough, and a retention member that is fixed to the body portion, that lies in a second plane parallel to the first plane, and that includes an edge that at least partially extends into the opening. The edge of the retention member selectively engages the recess of the strapping plate to releasably secure the cover plate sub-assembly thereto.

DESCRIPTION OF DRAWINGS

FIG. 2 is a rear plan view of a cover plate assembly in accordance with the present disclosure;

FIG. 3 is a cross-sectional view of the cover plate assembly of FIG. 2 along line 3-3;

FIG. 7 is a detailed view of an end of a spring arm of the retention member;

FIG. 8 is a detailed view of an alternative end of the spring arm of the retention member;

DETAILED DESCRIPTION

Figure 1:
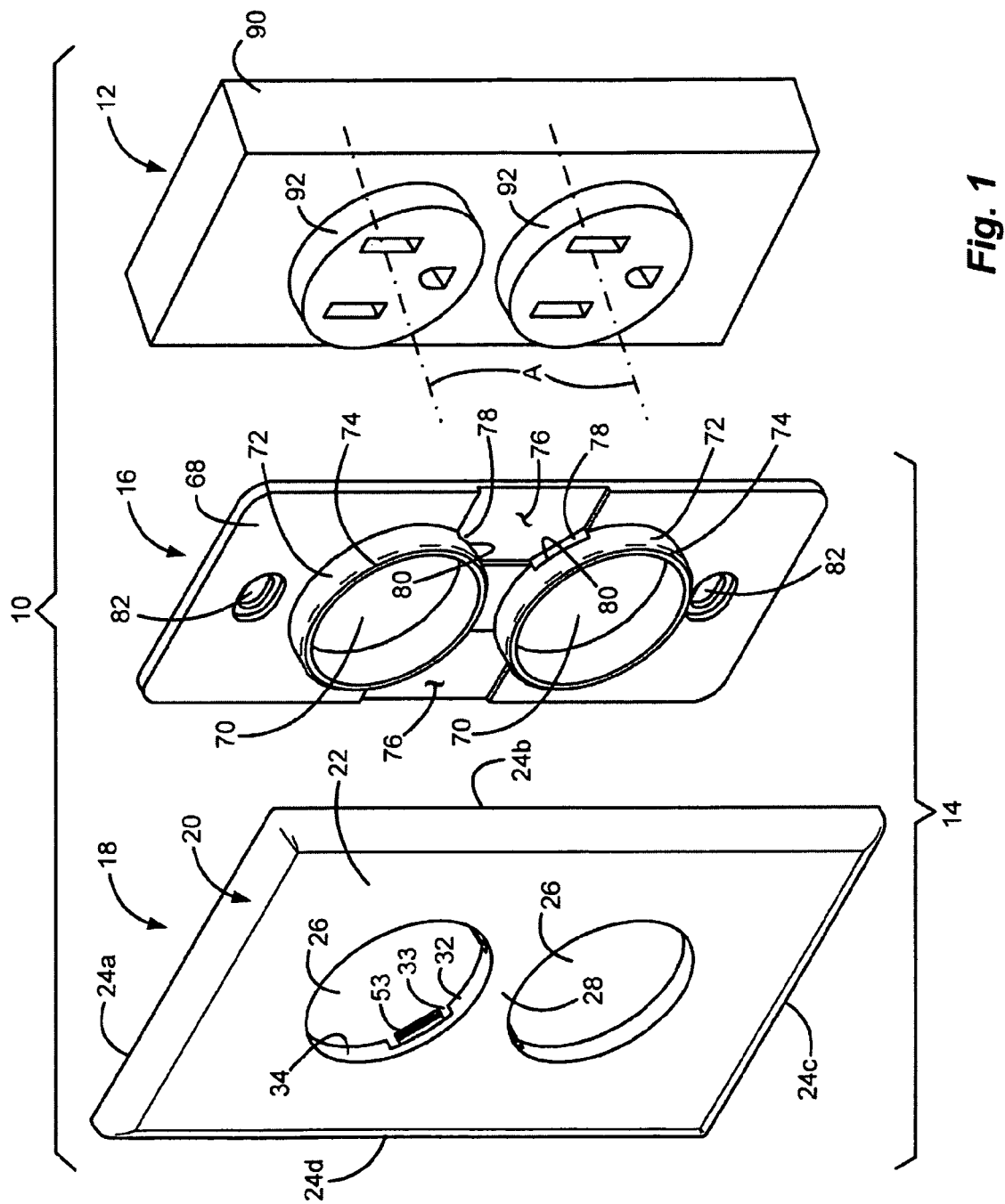
FIG. 1 is a perspective, exploded view of components of an electrical outlet assembly in accordance with the present disclosure.

FIG. 1 illustrates an embodiment of an electrical outlet assembly 10 in accordance with the present disclosure. The electrical outlet assembly 10 includes an electrical receptacle 12 and a plate assembly 14. The plate assembly 14 includes a strapping plate 16 and a cover plate sub-assembly 18. As discussed in further detail herein, the strapping plate 16 can be secured to the electrical outlet 12 and the cover plate sub-assembly 18 can be releasably secured to the strapping plate 16.

With particular reference to FIGS. 1-3, the cover plate sub-assembly 18 includes a cover plate 20 having a generally planar body portion 22 and edge portions 24a, 24b, 24c, 24d about the perimeter thereof. The body portion 22 generally lies within a first plane that is designated as plane X (see FIG. 3), and includes one or more openings 26 therethrough. As described in further detail below, the openings 26 enable the cover plate sub-assembly 18 to mount to the strapping plate 16, and also enable access to electrical receptacle(s) of the electrical outlet 12. Although the openings 26 are illustrated as round openings, it is appreciated that the shape of the openings 26 can vary. Other exemplar shapes include, but are not limited to, square and rectangular. The openings 26 define a web portion 28 therebetween. The web portion 28 includes a reinforcement feature 30 having wall portions 32 that run along a portion of the circumference of each opening 26. The reinforcement feature 30 provides increased strength and rigidity in the web portion 28. Walls 34 extend from a back surface 36 of the cover plate 20, and run along a portion of the circumference of the openings 26. Openings 33 are defined between the wall portions 32 and the walls 34. The edges 24a-24d of the cover plate 20 can be chamfered or rounded to extend out of the plane X. In this manner, the edges 24a-24d form reinforcing features to increase the rigidity and strength of the cover plate 20, to provide sufficient strength and stiffness to resist breakage during mounting, and to resist peel-back at the corners.

The cover plate 20 is preferably made from a dielectric, or electrically insulating, material. Exemplar materials include, but are not limited to, urea polymers, thermoplastic polymers such as nylons, polyesters, particularly polyethylene terphthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes, and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The cover plate 20 is preferably made from an electrically insulating, non-metallic material that meets relevant industry standards. The material can optionally include one or more additives that can enhance the processing of the material, and improve the quality and characteristics of the cover plate 20. Exemplar materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The cover plate 20 may be formed using various processes. Exemplar processes include, but are not limited to, thermoforming, blow molding and injection molding.

Referring now to FIGS. 1-6, retention members 40 are secured to the back surface 36 of the cover plate 20. Although two retention members 40 are illustrated, it is appreciated that the cover plate sub-assembly 18 can include more or fewer retention members 40. An embodiment having a single retention member 40, for example, is within the scope of the present disclosure. The retention members 40 are secured to the back surface 36 using any one of various fastening techniques. An exemplar fastening technique includes heat staking. For example, the cover plate 20 can include one or more stakes 42 extending therefrom, generally perpendicular to the plane X. The stakes 42 are received through corresponding openings 44 of the retention members 40 and ends of the stakes 42 can be deformed to secure the retention members 40. Other fastening means can be implemented in alternative embodiments. For example, a fastening member (not shown), such as a screw, can be used to secure the retention members 40 to the cover plate 20. The retention members 40 are secured adjacent to the cover plate 20 and generally lie within a second plane that is designated as plane Y (see FIG. 3). Planes X and Y are generally parallel to one another.

Figure 6:
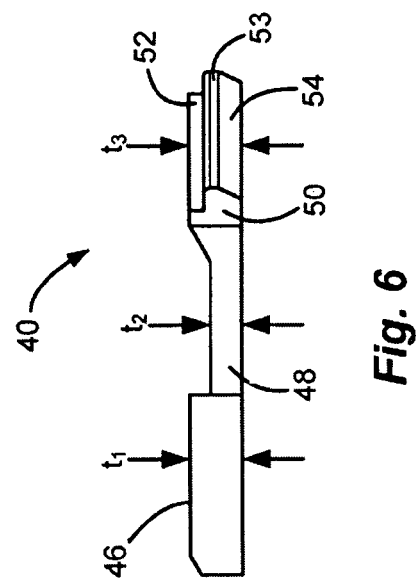
FIG. 6 is a side view of the retention member of FIG. 4.
Figure 4:
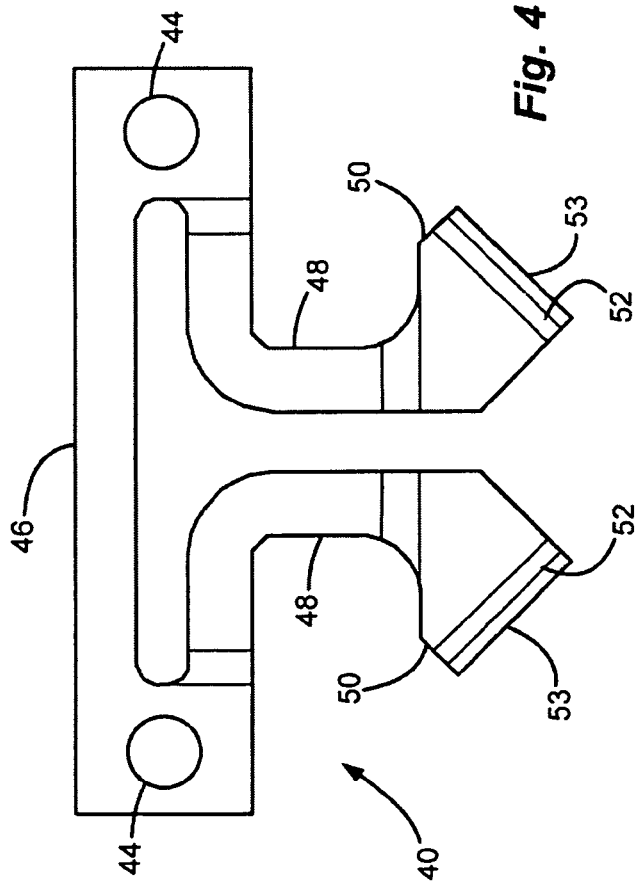
FIG. 4 is a plan view of a retention member of the cover plate assembly in accordance with one implementation of the present disclosure.
Figure 5:
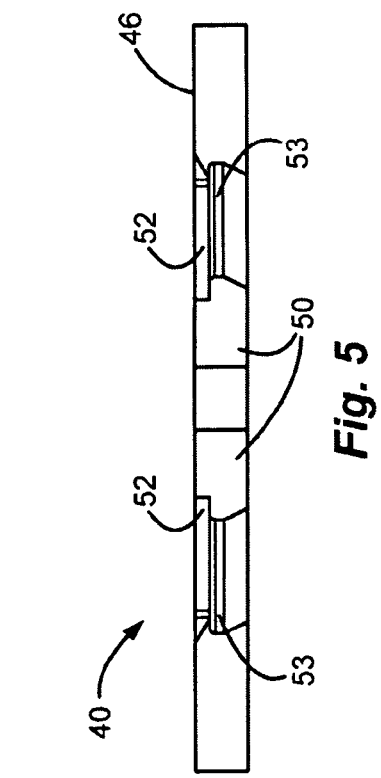
FIG. 5 is a front view of the retention member of FIG. 4.

With particular reference to FIGS. 4-6, each retention member 40 is an elastic member that exerts a resisting force when a force is applied thereto. More specifically, each retention member 40 includes a base 46 having a pair of spring arms 48 extending therefrom. Although two spring arms 48 are illustrated, it is appreciated that the retention member 40 can include more or fewer spring arms 48. An embodiment having a single spring arm 48, for example, is within the scope of the present disclosure. The base 46 includes a first thickness ($t_1$) and the spring arms 48 each include a second thickness ($t_2$). The second thickness ($t_2$) can less than the first thickness ($t_1$), equal to the first thickness ($t_1$) or greater than the first thickness ($t_1$). The spring arms 48 each include an end 50 that selectively engages the strapping plate 16, as described in further detail below. Each end 50 can include a third thickness ($t_3$). The third thickness ($t_3$) can be equal to or different from the first thickness ($t_1$), and can be equal to or different from the second thickness ($t_2$). Each end 50 also includes a notch 52, a leading edge 53, and a chamfer 54. When attached to the cover plate 20, the notch 52 faces the back surface 36 of the cover plate 20, and the chamfer 54 faces away from the back surface 36.

With particular reference to FIGS. 7 and 8, the notch 52 of the spring arm includes an edge surface 56, 56' and an engagement surface 58, 58'. In the embodiment of FIG. 7, the engagement surface 58 is at an angle $\alpha$ relative to the edge surface 56. Although the angle $\alpha$ is illustrated to be approximately 90°, the angle $\alpha$ can be equal to or less than 90°. In this manner, and as explained in further detail below, greater force is required to disengage the cover plate sub-assembly 18 from the strapping plate 16, portions of which are schematically shown in phantom in FIGS. 7 and 8, as discussed in further detail below. In the embodiment of FIG. 8, the engagement surface 58' is at an angle $\beta$ relative to the edge surface 56'. The angle $\beta$ is greater than 90° (i.e., is an obtuse angle). In this manner, and as explained in further detail below, less force is required to disengage the cover plate sub-assembly 18 from the strapping plate 16, as compared to that required using the embodiment of FIG. 7, for example.

Referring again to FIGS. 1 and 2, the retention members 40 are mounted to the back surface 36 such that the leading edge 53 of the ends 50 extend into the openings 26 of the cover plate 20. More specifically, the ends 50 of the retention members 40 extend through the openings 33 that are defined between the wall portions 32 and the walls 34. In this manner, and as explained in further detail below, the ends 50 can engage the strapping plate 16 as portions of the strapping plate 16 are received into the openings 26.

The retention members 40 can be made from a number of materials. In one embodiment, the retention members 40 are made from a metallic material. Exemplar metallic materials include, but are not limited to, carbon steels, alloy steels, corrosion resisting steels, phosphor bronze, spring brass, beryllium copper, nickel alloy steels, titanium alloy steels and/or combinations thereof. The retention members 40 can be formed using one or more processes including, but not limited to, stamping.

In an alternative embodiment, the retention members 40 are made from a dielectric, or electrically insulating material that can include, but is not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. In this alternative embodiment, the retention members 40 are preferably made from an electrically insulating, non-metallic material that meets relevant industry standards. The material can optionally include one or more additives that can enhance the processing of the material, and improve the quality and characteristics of the retention members 40. Exemplar materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The retention members 40 may be formed using various processes. Exemplar processes include, but are not limited to, thermoforming, blow molding and injection molding. In one embodiment, the retention members 40 can be integrally formed with the cover plate 20 during a forming process.

Figure 10:
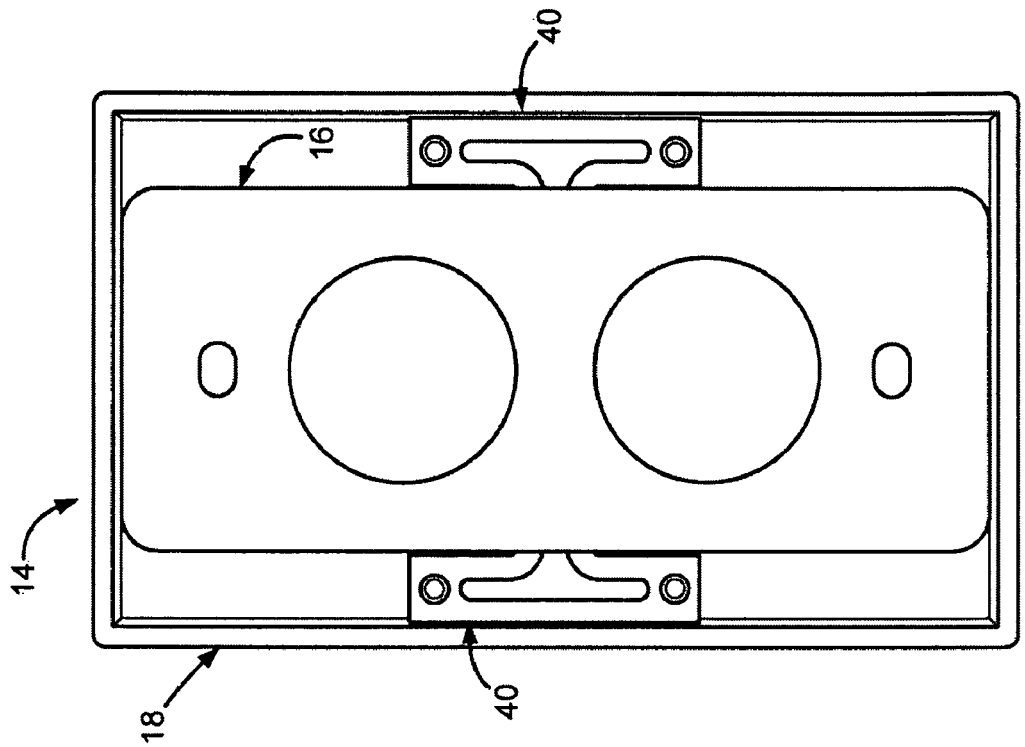
FIG. 10 is a rear plan view of a mounting plate engaged with the cover plate assembly.
Figure 9:
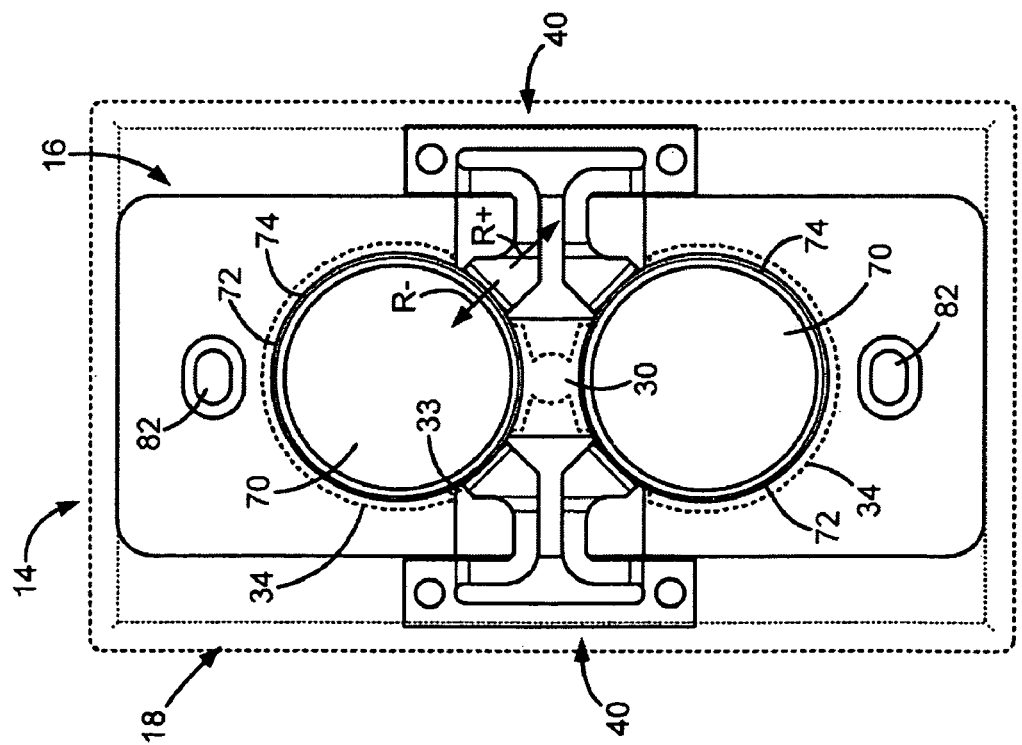
FIG. 9 is a front plan view of the mounting plate engaged with the cover plate assembly.
Figure 11:
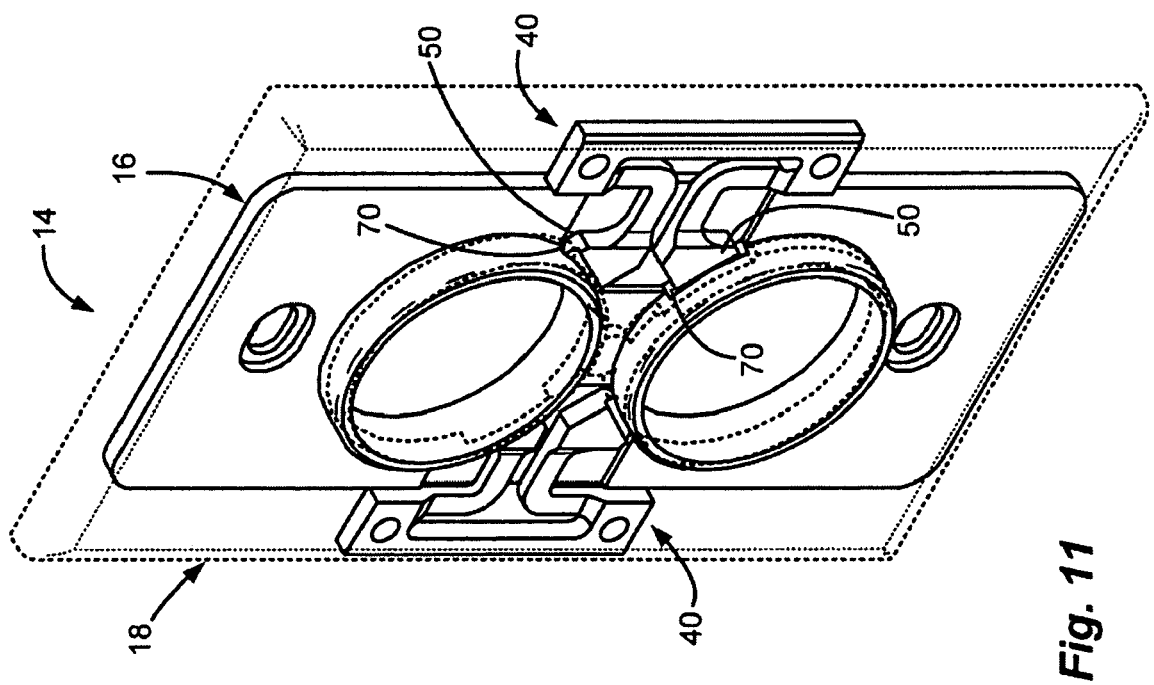
FIG. 11 is a perspective view of the mounting plate engaged with the cover plate assembly.

Referring now to FIGS. 1, 9 and 10, the strapping plate includes a body portion 68 having openings 70 formed therethrough. As described in further detail below, the openings 70 enable the strapping plate 16 to be assembled onto the electrical outlet 12, and also enable mounting of the cover plate sub-assembly 18 to the strapping plate 16. Each opening 70 includes a cylindrical wall 72 that runs about the perimeter of the opening 70, and that extends from the body portion 68. Each wall 72 includes a top surface having a rounded or chamfered edge 74. Recesses 76 are formed in the body portion to accommodate the retention members 40 of the cover plate sub-assembly 20, as explained in further detail below. Recesses 78 are also formed in the base of each wall 72. Each recess 78 includes an engagement edge 80. Although the illustrated embodiment includes recesses 78 formed in the walls 72, other embodiments can include openings that run through the respective walls 72. The strapping plate 16 also includes openings 82 that enable the electrical outlet assembly 10 to be secured to an electrical box (not shown). For example, fastening members (not shown) can be received through each opening 82 and into mating openings (not shown) of the electrical box.

The strapping plate 16 can be selectively attached or permanently attached to the electrical outlet 12. In one embodiment, the strapping plate 16 can be selectively attached to the electrical outlet 12 using fastening means including, but not limited to, screws (not shown). For example, the fastening means can be received, through openings in the strapping plate 16 and can be received into corresponding openings of the electrical outlet 12 to secure the strapping plate 16 thereto. In alternative embodiments, the strapping plate 16 can be permanently attached to the electrical outlet 12 using fastening means including, but not limited to, rivets (not shown). For example, the rivets can be received through openings in the strapping plate 16 and can be received into corresponding openings of the electrical outlet 12. The rivet can be deformed, or upset, to secure the strapping plate 16 to the electrical outlet 12.

The strapping plate 16 is preferably made from a dielectric, or electrically insulating, material. Exemplar materials include, but are not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The strapping plate 16 is preferably made from an electrically insulating, non-metallic material that meets relevant industry standards. The material can optionally include one or more additives that can enhance the processing of the material, and improve the quality and characteristics of the strapping plate 16. Exemplar materials include, but are not limited to, oxidative and thermal stabilizers lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The strapping plate 16 may be formed using various processes. Exemplar processes include, but are not limited to, thermoforming, blow molding and injection molding.

With particular reference to FIGS. 1 and 9-11, assembly of the cover plate sub-assembly 20 (shown in phantom in FIGS. 9 and 11) to the strapping plate 16 will be described in detail. As the cover plate sub-assembly 20 is moved into engagement with the strapping plate 16, the walls 72 of the strapping plate 16 are received into the corresponding openings 26 of the cover plate 20. The ends 50 of the biasing members 40 come into contact with the top surface of the walls 72 of the strapping plate. For example, the chamfer 54 of the ends 50 engage the rounded or chamfered edge 74 of the top surface of the walls 72. As the cover plate sub-assembly 18 is pressed into further engagement with the strapping plate 16, the walls 72 of the strapping plate 16 exert a force on the retention members 40 that induces flexing of the spring arms 48 in a first direction. For example, a spring arm 48 of a retention member 40 is induced to flex in a direction R+ (see FIGS. 2 and 10). When the cover plate sub-assembly 18 is fully mounted onto the strapping plate 16, the ends 50 of the spring arms 48 align with the recesses 78, and spring into engagement with the recesses 78 in a second direction. For example, a spring arm 48 of a retention member 40 springs into engagement with the recess 78 in a direction R− (see FIGS. 2 and 10).

Once assembled, the interface between the engagement edges 80 of the recesses 78 and the engagement surfaces 58, 58' of the notches 52 of the retention members 40 inhibit removal of the cover plate sub-assembly 18 from the strapping plate 16. This engagement is schematically illustrated in FIGS. 7 and 8, which include the wall 72, the recess 78 and the engagement edge 80 of the strapping plate 16 shown in phantom. The amount of force required to disengage the cover plate sub-assembly 18 from the strapping plate 16 can be based on the particular arrangement of the engagement edge 80 of the recess 78 and the engagement surface 58, 58' of the notch 52. For example, if the engagement edge 80 and an engagement surface are generally parallel to one another, such as may be the case with the engagement surface 58 of FIG. 7, a first disengagement force may be required. If the engagement edge 80 and the engagement surface are not parallel to one another, such as may be the case with the engagement surface 58' of FIG. 8, a second disengagement force may be required. The second disengagement force can be less than the first disengagement force, for example.

The amount of force required to disengage the cover plate sub-assembly 18 from the strapping plate 16 can also be based on the number of retention members 40 and/or the number of spring arms 48 provided with each retention member 40. For example, less force may be required to disengage a cover plate sub-assembly 18 having a single retention member 40 than one having multiple retention members. As another example, less force may be required to disengage a cover plate sub-assembly 18 having a retention member 40 with a single spring arm 48 than a cover plate sub-assembly 18 having a retention member 40 with multiple spring arms 48.

The amount of force required to disengage the cover plate sub-assembly 18 from the strapping plate 16 can further be based on the characteristics of the retention member 40. More specifically, sections of the retention member can be thinner, or thicker to respectively decrease, or increase the spring constant of the retention member. In this manner, the amount of force required to induce flexing of the spring arms, for example, can be increased or decreased. For example, a retention member 40 having a thicker spring arm 48 will require an increased force to disengage the cover plate sub-assembly 18 from the strapping plate 16 than a retention member 40 having a thinner spring arm 48.

Referring again to FIG. 1, the electrical outlet 12 can include any one of various electrical outlets known in the industry and can include, but is not limited to, a single gang (SG) outlet, a double gang (DG) outlet, any multi-gang outlet, a duplex outlet, and a multi-duplex outlet. In general, the electrical outlet 12 includes a body 90 and electrical receptacles 92. Although two electrical receptacles 92 are illustrated, the electrical outlet 12 can include fewer or more than two electrical receptacles 92. An electrical outlet 12 having four electrical receptacles 92, for example, is within the scope of the present disclosure. The number of electrical receptacles 92 preferably corresponds to the number of openings 26, 70 in the cover plate 20 and the strapping plate 16, respectively. Furthermore, although the electrical receptacles 92 are illustrated to be round in shape, the shape of the electrical receptacles 92 can vary. By way of non-limiting example, the electrical receptacles 92 can be square or rectangular in shape. In general, the shape of the openings 26, 70 of the cover plate 20 and strapping plate 16, respectively, correspond to the shape of the electrical receptacle 92.

In one embodiment, the electrical outlet 12 can include a reorientable electrical outlet such as those disclosed in commonly assigned U.S. patent application Ser. No. 11/302,924 to Kimberly R. Gerard, which was filed on Dec. 14, 2005, and the disclosure of which is expressly incorporated herein by reference in its entirety. An exemplar reorientable electrical outlet, such as those disclosed in commonly assigned U.S. patent application Ser. No. 11/302,924, can include an electrical receptacle that is rotatably disposed in a housing. In the case of the electrical outlet 12, the electrical receptacles 92 can be rotatably supported by the body 90 to be rotatable about respective axes A. It is also contemplated that the electrical outlet 12 can include a ground fault interrupt (GFI) outlet having a ground fault circuit interrupter (GFCI). The GFCI can include, for example, reset or test buttons, and may be implemented in combination with the embodiments described herein.

Components of the electrical outlet 12 are preferably formed of nonconductive material such as plastic or polyvinyl chloride (PVC). The nonconductive components may also be formed of nylon or any other suitable supporting material. In some embodiments, the electrical outlet 12 may be manufactured using resins containing high impact amorphous polycarbonate (PC) and acrylonitrile-butadiene-styrene (ABS) terpolymer blends, such as Cycoloy® CY6120 from GE Plastics. By varying the ratio of PC to ABS in the resin, the electrical outlet 12 may be tailored for residential or industrial use. Further, the overall cost of the electrical outlet 12 may be reduced by employing regrind, or powdering, techniques. Preferably, no more than 15% regrind is employed.

Although the embodiments here and have been described in detail, it will be apparent to those skilled in the art that many embodiments taking a variety of specific forms and reflecting changes, substitutions, and alterations can be made without departing from the spirit and scope of the invention. The described embodiments illustrate the scope of the claims but do not restrict the scope of the claims.

What is claimed is:

1. A plate assembly for an electrical outlet, comprising:
    a strapping plate that is attachable to the electrical outlet; and
    a cover plate sub-assembly that is selectively attachable to the strapping plate, the cover plate sub-assembly comprising:
        a cover plate comprising outer edge portions circumscribing a generally planar body portion that lies between the outer edge portions in a first plane and that has a generally planar back surface disposed parallel to the first plane; and
        a first retention member disposed adjacent to and fixed to the back surface, that lies in a second plane parallel to the first plane,
        wherein the first retention member selectively engages the strapping plate to releasably secure the cover plate sub-assembly thereto.

2. The plate assembly of claim 1, wherein the first retention member includes at least one spring arm that selectively engages a recess of the strapping plate.

3. The plate assembly of claim 1, wherein the first retention member includes an end that at least partially extends into an opening defined in the body portion, the end selectively engaging the strapping plate.

4. The plate assembly of claim 1, wherein the first retention member includes an engagement surface that interfaces with an engagement edge of the strapping plate.

5. The plate assembly of claim 4, wherein the engagement surface is at an angle relative to the engagement edge of the strapping plate.

6. The plate assembly of claim 1, wherein the first retention member includes an arm portion having a first thickness, and an end portion having a second thickness greater than the first thickness.

7. The plate assembly of claim 1, wherein the cover plate sub-assembly further comprises a second retention member that is fixed to the body portion, and that lies in the second plane.

8. The plate assembly of claim 1, wherein the cover plate sub-assembly and the strapping plate include respective openings, through which an electrical receptacle of the electrical outlet is accessible.

9. An electrical outlet assembly, comprising:
    an electrical outlet having at least one electrical receptacle; and
    a plate assembly that is attached to the electrical outlet, the plate assembly comprising:
        a strapping plate that is attachable to the electrical outlet; and
        a cover plate sub-assembly that is selectively attachable to the strapping plate, the cover plate sub-assembly comprising:
            a cover plate comprising outer edge portions circumscribing a generally planar body portion that lies between the outer edge portions in a first plane and that has a generally planar back surface disposed parallel to the first plane; and
            a first retention member disposed adjacent to and fixed to the back surface, that lies in a second plane parallel to the first plane, wherein the first retention member selectively engages the strapping plate to releasably secure the cover plate sub-assembly thereto.

10. The electrical outlet assembly of claim 9, wherein the first retention member includes at least one spring arm that selectively engages a recess of the strapping plate.

11. The electrical outlet assembly of claim 9, wherein the first retention member includes an end that at least partially extends into an opening defined in the body portion, the end selectively engaging the strapping plate.

12. The electrical outlet assembly of claim 9, wherein the first retention member includes an engagement surface that interfaces with an engagement edge of the strapping plate.

13. The electrical outlet assembly of claim 12, wherein the engagement surface is at an angle relative to the engagement edge of the strapping plate.

14. The electrical outlet assembly of claim 9, wherein the first retention member includes an arm portion having a first thickness, and an end portion having a second thickness greater than the first thickness.

15. The electrical outlet assembly of claim 9, wherein the cover plate sub-assembly further comprises a second retention member that is fixed to the body portion, and that lies in the second plane.

16. The electrical outlet assembly of claim 9, wherein the cover plate sub-assembly and the strapping plate include respective openings, through which the electrical receptacle is accessible.

17. A plate assembly for an electrical outlet, comprising:
a strapping plate that is attachable to the electrical outlet, and that includes a recess defined therein; and
a cover plate sub-assembly that is selectively attachable to the strapping plate, the cover plate sub-assembly comprising:
a cover plate comprising outer edge portions circumscribing a generally planar body portion that lies between the outer edge portions in a first plane and that has a generally planar back surface disposed parallel to the first plane, and that has an opening therethrough; and
a retention member disposed adjacent to and fixed to the back surface, that lies in a second plane parallel to the first plane, and that includes an edge that at least partially extends into the opening,
wherein the edge of the retention member selectively engages the recess of the strapping plate to releasably secure the cover plate sub-assembly thereto.

18. The plate assembly of claim 17, wherein the retention member includes at least one spring arm that includes the edge.

19. The plate assembly of claim 17, wherein the retention member includes an engagement surface that interfaces with an engagement edge of the recess of the strapping plate, and wherein the engagement surface is at an angle relative to the engagement edge of the strapping plate.

20. The plate assembly of claim 17, wherein the strapping plate includes an opening that aligns with the opening of the cover plate sub-assembly such that the electrical receptacle is accessible through both openings.

* * * * *